United States Patent [19]

Hoshimi et al.

[11] 4,453,250
[45] Jun. 5, 1984

[54] PCM SIGNAL PROCESSING APPARATUS

[75] Inventors: Susumu Hoshimi, Yokohama; Tadashi Kojima, Yokosuka, both of Japan

[73] Assignees: Sony Corporation; Tokyo Shibaura Denki Kabushiki Kaisha, both of Japan

[21] Appl. No.: 324,815

[22] Filed: Nov. 25, 1981

[30] Foreign Application Priority Data

Nov. 28, 1980 [JP] Japan ................................. 55-168751

[51] Int. Cl.³ ........................ G06F 11/10; G11B 5/00
[52] U.S. Cl. .................................... 371/40; 360/38.1; 371/38
[58] Field of Search ........................... 371/38, 39, 40; 360/38.1

[56] References Cited

U.S. PATENT DOCUMENTS

| | | | |
|---|---|---|---|
| 4,206,440 | 6/1980 | Doi et al. ................................ | 371/38 |
| 4,211,997 | 7/1980 | Rudnick et al. ........................ | 371/38 |
| 4,234,896 | 11/1980 | Onishi et al. ......................... | 360/38.1 |
| 4,238,852 | 12/1980 | Iga et al. ............................... | 371/40 |
| 4,306,305 | 12/1981 | Doi et al. ............................... | 371/38 |
| 4,376,290 | 3/1983 | Shirota ................................... | 360/38.1 |
| 4,380,071 | 4/1983 | Odaka ..................................... | 371/40 |

*Primary Examiner*—Charles E. Atkinson
*Attorney, Agent, or Firm*—Hill, Van Santen, Steadman & Simpson

[57] ABSTRACT

A PCM signal processing apparatus adapted to receive successive transmission blocks, each of which comprise time-interleaved PCM data, error correction and error detection words, and which comprises a detecting circuit responsive to error detecting words for detecting if a received transmission block contains an error, error identifying means for identifying as erroneous each of the time-interleaved words included in the received transmission block which has been detected as containing an error, de-interleaving means for time-deinterleaving each received transmission block to recover a de-interleaved block which comprises de-interleaved PCM and error-correction words. An error compensating device is responsive to the identification by the error identifying device for compensating at least the erroneous PCM word in the de-interleaved block with a substitute PCM word when the error syndrome indicates the presence of an erroneous PCM word and the error correction device cannot detect the error or the location of the erroneous word is unknown. An inhibit device for inhibiting the error compensating device during the state when the location of the erroneous word is unknown follows a predetermined number of blocks, and slew rate control device or filter device is coupled to the de-interleaving device for passing the de-interleaved PCM word at a predetermined slew rate, and switching device is responsive to the output of the inhibit device and for selecting the slew rate of the control device or the filter device.

9 Claims, 9 Drawing Figures

PCM SIGNAL PROCESSING APPARATUS

BACKGROUND OF THE INVENTION

1. Field of the Invention

This invention generally relates to a PCM Pulse Code Modulation signal processor and particularly to a PCM signal processor in which an analog signal such as an audio signal is digitized for recording and reproducing on a recording medium such as tape or a disk.

2. Description of the Prior Art

There has been proposed a PCM recording and reproducing apparatus for modulating an analog audio signal such as music on a PCM signal and to add an error correction code and an error detection code thereto so as to convert it to a signal configuration similar to a television signal, which is recorded and reproduced by a VTR (Video Tape Recorder). In the VTR, when dropout is caused by dust on the magnetic tape, which is the recording medium, there is a possibility that a burst error will occur in the recorded PCM signal. If such burst error occurs, it becomes quite difficult to error-correct the lost data.

To cope with this the following operation is performed. In a PCM processor wherein an audio PCM signal is converted to a quasi-video signal, upon converting of the audio PCM signal to the video signal, i.e., during recording, the PCM data is separated for each sampled word having a predetermined number thereby to form one block and an error correction code is generated for this one block of PCM data. The PCM data and the error correction code are respectively interleaved so as to have different delay times for each other and the error detection code is further added to the interleaved data, and signals are then converted to a video signal. When the VTR reproduces the signal thus recorded, the video signal is converted to the audio PCM signal in an operation opposite that described above, and de-interleaving is performed so as to disperse the burst error and to correct the data. According to such an arrangement, during normal reproduction, all correction capabilities are utilized so that nearly all of the original PCM data can be reproduced.

However, since the error detection function cannot detect or identify the error with absolute reliability, the data is supplied to an error correction circuit where it is not always regarded as erroneous. When the VTR has a dropout compensation circuit or the like it can replace a previous block data with the dropped data when the dropout occurs and is utilized by a recording and reproducing apparatus. A data array is converted to an original array by the de-interleaving during reproduction which may become different from the original data. When different data which has already been interleaved are connected to each other so they can be edited, different data may be mixed with the data to change it to the correct array by the de-interleaving. In these cases, since the error correcting circuit performs the error correction, the error correcting circuit produces data quite differently from the original data and when the data is supplied and converted to the audio signal by a D/A (Digital-Analog) converter, such audio signal may be heard as an offensive abnormal sound.

In order to prevent erroneous correction, a method has been proposed where the error decision is performed by employing both the error detection results using an error detection code and syndromes formed from the error correction code and the reproduced PCM data. That is, when an error syndrome indicates the presence of an error although an absence of an error is detected by error detecting means and when the syndrome decides on the existence of another erroneous word in addition to the erroneous word identified by the error indicator which is the result of the error detection and the position thereof is unknown, the error correction thereof is inhibited and instead, all PCM words within the block are compensated. For compensation, there is used a front-end hold to interpolate the erroneous word with the correct word occurring prior thereto and a mean value interpolation to interpolate the erroneous word with the mean value between the correct words before and behind thereof. Further, if such abnormal states occur in succession, the compensating operation becomes impossible so that muting must be applied.

The method thus described can prevent erroneous correction. In fact, to apply the muting causes the sound to be lost for some periods and when two system inputs are provided for the reproduced input which are switched or when a magnetic tape wherein data of two forms are connected and recorded and is reproduced by a PCM editing apparatus, although the number of errors in data detected by the error detecting signal is small there remains a drawback in that such erroneous data is detected as an abnormality caused by a mixture of different data into one block after de-interleaving and this results in muting which causes sound to be lost in the proximity of a connecting point of the data for a fixed time period.

SUMMARY OF THE INVENTION

An object of this invention is to provide a PCM signal processor which can remove the afore-described defects.

Another object of this invention is to provide a PCM signal processor which can prevent erroneous corrections and can eliminate muting as much as possible.

A further object of this invention is to provide a PCM signal processor in which no sound is lost during cueing of the different audio signals and abnormal sound does not occur.

According to an aspect of the present invention, there is provided a PCM signal processing apparatus adapted to receive successive transmission blocks, each comprising time-interleaved PCM data, error correction and error detection words, and comprises a detecting device responsive to the error detecting words for detecting if a received transmission block contains an error, error identifying device for identifying as erroneous each of the time-interleaved words included in the received transmission block which has been detected as containing an error. A de-interleaving device time-de-interleaves each received transmission block to recover a de-interleaved block comprised of de-interleaved PCM and error-correction words, with erroneous ones of the de-interleaved words being respectively identified. A syndrome generating device is coupled to the de-interleaving device for generating error syndrome signals using the de-interleaved PCM and error-correction words in the de-interleaved block. An error correcting device is responsive to the error syndrome signal and-/or the identification of the error identifying device for correcting an erroneous PCM word in the de-interleaved block as a function of the remaining non-erroneous PCM and error-correction words in that de-interleaved block. The error compensating device is responsive to the identification of the error identifying device for compensating at least the erroneous PCM word in the de-interleaved block with a substitute PCM word when the error syndrome signal indicates the presence of an erroneous PCM word and the error correction device cannot correct it or the location of the erroneous word is unknown. An inhibit device inhibits the error compensating device when the location of the erroneous word is unknown and succeeds a predetermined number of blocks. A slew rate control device or filter device is coupled to the de-interleaving device for passing the de-interleaved PCM word with a predetermined slew rate and a switching device is responsive to inhibiting of the inhibit device and for selecting the slew rate of the control device or the filter device.

The other objects, features and advantages of the present invention will become apparent from the following description taken in conjunction the accompanying drawings through which the like references designate the same elements and parts.

DESCRIPTION OF THE PREFERRED EMBODIMENTS

An embodiment of this invention is described which illustrates a case where the invention is applied to an apparatus comprising an audio PCM recording and reproducing apparatus in which a conventional home rotary two heads type VTR is used and is not modified but an adaptor is connected to it. The PCM adaptor is arranged to convert audio PCM data to a signal format similar to a television signal and a standard format such as shown in FIGS. 1A–1D.

Figure 1A:
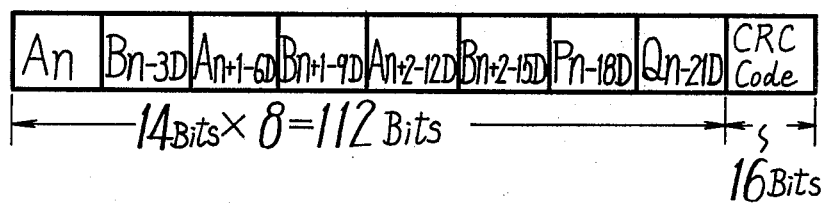
FIGS. 1A to 1D are diagrams showing a configuration of one block data and waveforms of the recording signal in one embodiment of this invention.
Figure 1B:
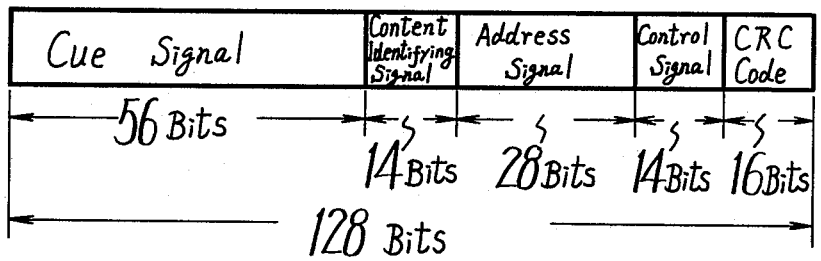

FIG. 1A illustrates a data block which is to be inserted into one horizontal interval (1H) and FIG. 1B illustrates a control block to be inserted into another 1H. Audio signals of two channels are respectively sampled at a sampling frequency fs of 44.056 KHz and are converted to data words Ai and Bi each comprising 14 bits. One block composes a PCM word of six words, parity words Pi and Qi of two words for error correction and a CRC (Cyclic Redundancy Check) code of 16 bits to detect the absence or presence of the aforesaid data having a total of eight words. Accordingly, the length of one block becomes 128 bits. The parity words Pi and Qi for error correction are formed with respect to the PCM word of six words and interleaved word by word. In FIG. 1A, suffixes attached to each word show the interleaving relationship where a unit delay amount is represented by D (block). The control block seen in FIG. 1B comprises a cue signal of 56 bits, a content identifying signal of 14 bits, an address signal of 28 bits, a control signal of 14 bits and a CRC code of 16 bits so as to detect errors.

Figure 1C:
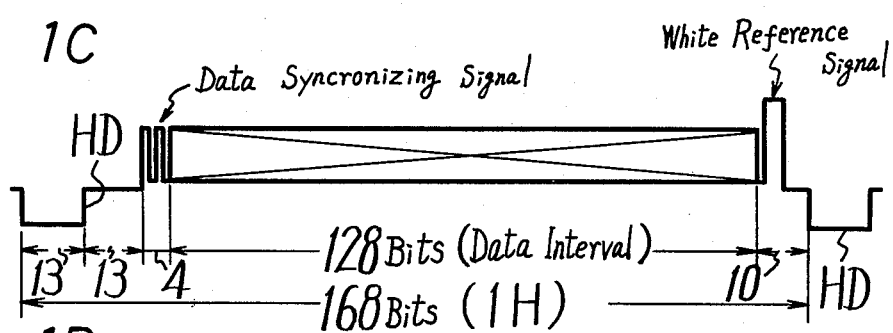
Figure 1D:
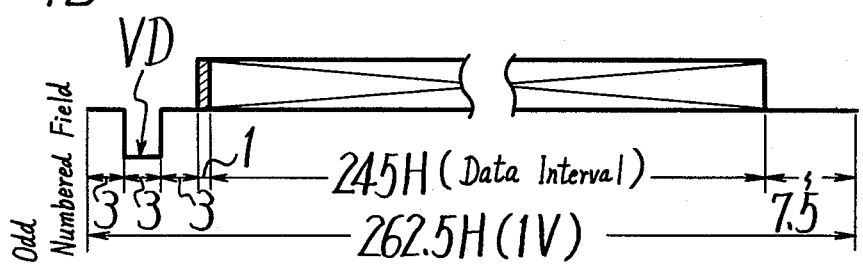
Figure 1D:
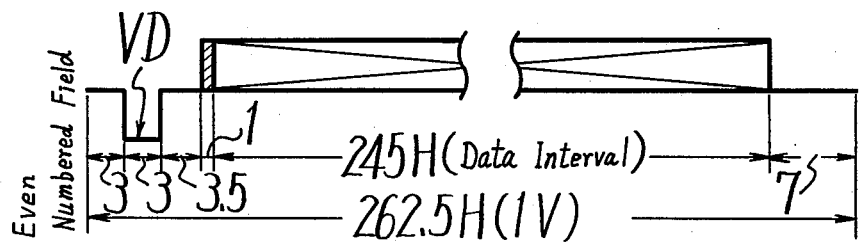

As illustrated in FIG. 1C, into 1H (168 bits) of the horizontal synchronizing signal HD is inserted one block of 128 bits. A data synchronizing signal is added to the front thereof and a white reference signal is added to the rear thereof. Also, as illustrated in FIG. 1D, the data interval is 245H in one field (1V) excluding an equalizing pulse interval and a vertical synchronizing signal (VD) interval having a total of 9H (9.5H for an even-numbered field) and an interval of 7.5H (7H for the even-numbered field) to include the head switching timing. As shown by the cross-hatched section in the Figure, the control block is inserted into the first 1H.

Figure 2:
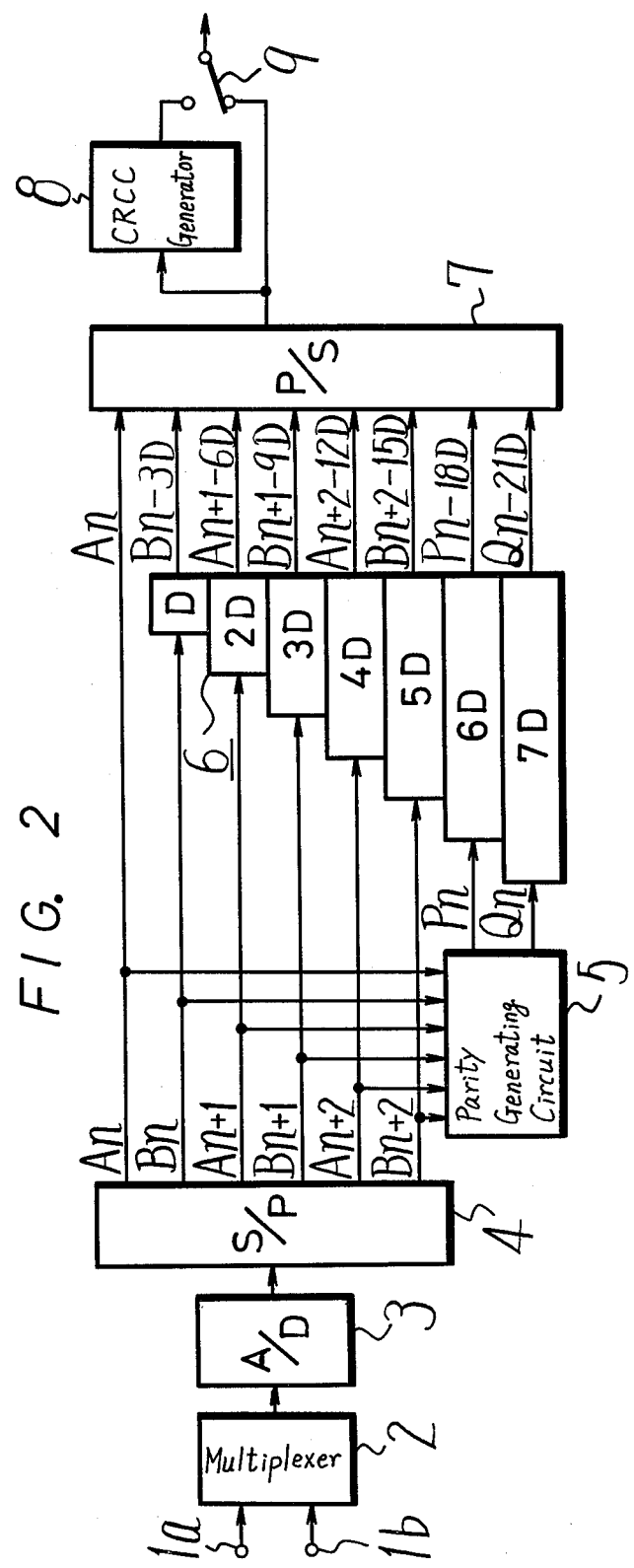
FIG. 2 is a block diagram showing an arrangement of a recording encoder.

FIG. 2 shows an arrangement of a recording encoder wherein there is applied to each input terminal 1a and 1b separate analog output signals of the A and B channels derived from a sample-and-hold circuit (not shown) which is supplied through a multiplexer 2 to an A/D (Analog and Digital) converter 3 where they are digitized with one word for each sample. The output of the A/D converter 3 is supplied to a serial-parallel converter 4 and is converted to a six parallel words. These six words such as An, Bn, An+1, Bn+1, An+2 and Bn+2 are supplied to a parity generating circuit 5 and to an interleaving delay circuit 6. The parity generating circuit 5 operates as follows:

$$P_n = A_n \oplus B_n \oplus A_{n+1} \oplus B_{n+1} \oplus A_{n+2} \oplus B_{n+2}$$

$$Q_n = T^6 A_n \oplus T^5 B_n \oplus T^4 A_{n+1} \oplus T^3 B_{n+1} \oplus T^2 A_{n+2} \oplus T B_{n+2}$$

thereby producing first and second parity words. In the above equation, reference letter n denotes a multiple of either 0 or 3, + represents a modulo 2 addition of each bit corresponding to each word and T represents a generating matrix. The first and second parity words can correct one word error within one block and if the position of the error word is known, two word errors can also be corrected. A delay circuit 6 is provided to delay the six PCM data series from the serial-parallel converter 4 and the two parity data series from the parity generating circuit 5 by D each of a unit delay time with each differing by D (O, D, 2D, 3D, 4D, 5D, 6D, 7D) and in practice, a memory RAM a Random Access Memory is utilized for such delay. In other words, the write and read addresses of the memory are controlled so as to perform the interleaving and the frequency of the read clock signal is raised so it is higher than the write clock signal so that the time-base is compressed thereby forming a data blank corresponding to a vertical blanking period. An output of the delay circuit 6 is supplied to a parallel-serial converter 7 and converted to bit serial form and the CRC code is added to it by a CRC code generator 8 and a switch 9 so as to produce a data output having the form shown in FIG. 1A. To this data output are added the synchronizing signal, the equalizing pulse and so forth so as to form a recording signal of the same signal configuration as the television signal seen in FIGS. 1C and 1D, which is then applied to a video input terminal of the VTR.

Figure 3:
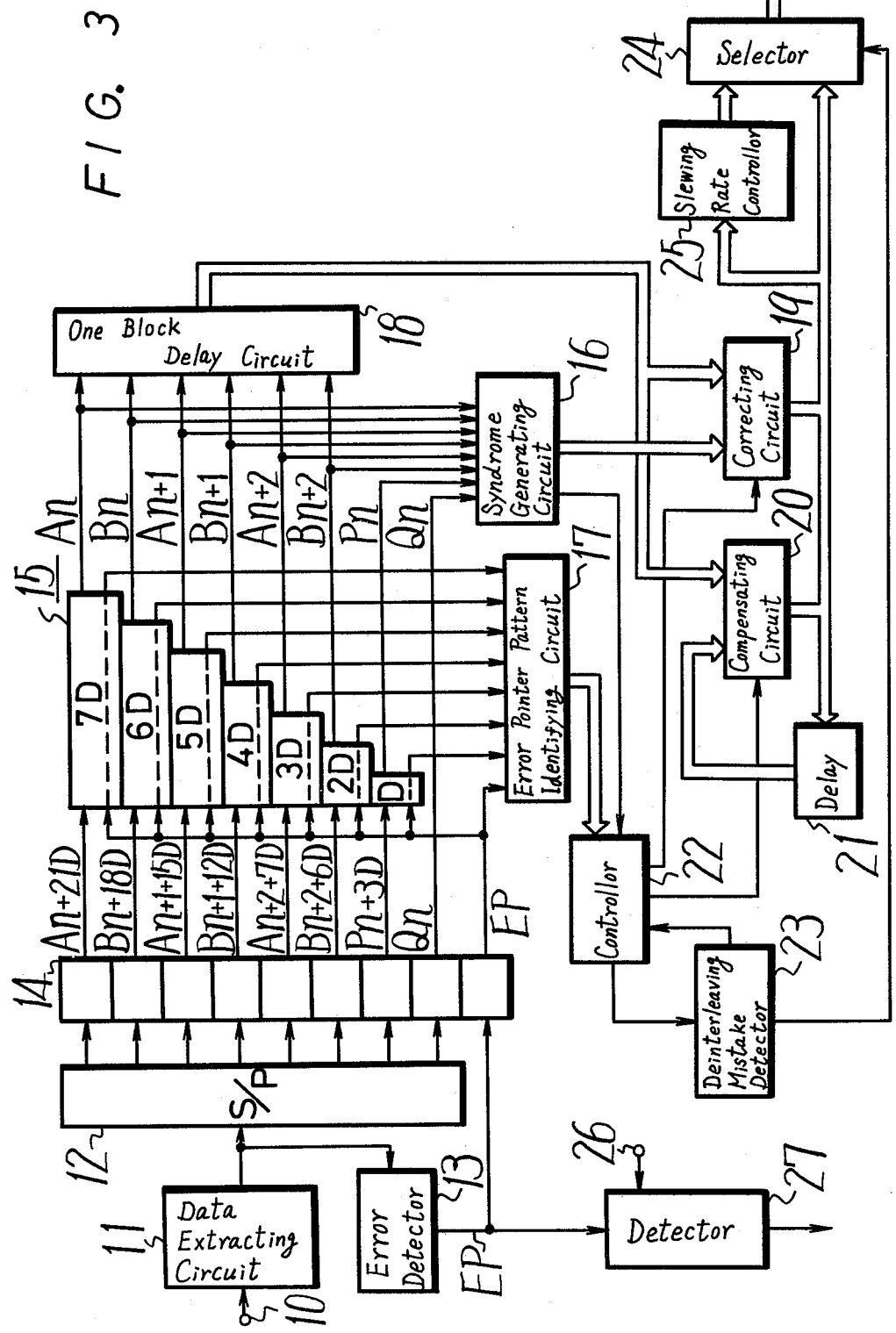
FIG. 3 is a block diagram showing a reproducing decoder.

FIG. 3 illustrates an arrangement of a reproducing decoder. From an input terminal 10 is supplied a reproduced signal produced at the video output terminal of the VTR which is connected to a waveform shaping and data extracting circuit 11. The synchronizing signal is separated in a manner not shown from the reproduced signal and is employed to form a timing pulse signal required for data processing in a reproducing system.

The reproduced data is applied to a serial-parallel converter 12 and to an error detector 13. The error detector 13 is provided to detect errors in the reproduced data in each block by utilizing the CRC code and produces an error indicator signal EP which is "1" if an error exists and is "0" if no error exists. Eight words appearing in the output of the serial-parallel converter 12 and the error indicator signals EP are applied to a buffer memory 14. The error detector 13 produces the error indicator signal EP with a timing at which all data of one block are input and output to the buffer memory 14. The one block data and the error indicator signal Ep are made synchronized with each other and with this block. To each of the eight series data appearing at the output of the buffer memory 14 is applied a delay (7D, 6D, 5D, 4D, 3D, 2D, D, 0) which is applied in a de-interleaving delay circuit 15 so as to cancel the delay previously obtained by the inerleaving. In this case, the error indicator signal EP as well as the data are applied to the delay circuit 15 wherein the error data signal EP for one bit is added to each word of the data.

The data circuit 15 is, in practice, comprised of a memory and is adapted to control addresses thereof so as to apply a predetermined delay as well as to make the frequency of the read clock signal lower than that of the write clock signal thereby performing time-base extension. The data which has been de-interleaved by the delay circuit 15 is supplied to a syndrome generating circuit 16 and the error indicating signal EP accompanying the data is supplied to an error pointer pattern identifying circuit 17. The PCM data derived from the delay circuit 15 is applied, through one block delay circuit 18 to a correcting circuit 19 and to a compensating circuit 20. To the correcting circuit 19 is supplied the syndrome signal from the syndrome generating circuit 16 and to the compensating circuit 20 is supplied the previous PCM data which has passed through a delay circuit 21 in order to interpolate the mean value. A controller 22 is provided to control whether error correction is done by the correcting circuit 19 or whether error compensation is done by the compensating circuit 20. The controller 22 receives a discrimination result from the error indicator pattern discriminating circuit 17 and a syndrome discrimination result from the syndrome generating circuit 16.

The manner of correcting or compensating an erroneous word is as follows. For the PCM data of one block to generate the parity words P and Q, six words $W_1$ to $W_6$ may be considered. Six words $W_1$ to $W_6$ and the parity words P and Q are reproduced and supplied to the syndrome generating circuit 16 as follows.

$$S_1 = P \oplus \sum_{n=1}^{6} Wn = Pe \oplus \sum_{n=1}^{6} Wne$$

$$S_2 = Q \oplus \sum_{n=1}^{6} T^{7-n} Wn = Qe \oplus \sum_{n=1}^{6} T^{7-n} Wne$$

where reference letters Pe and Qe designate error patterns of the parity words P and Q, the error patterns in which, for example, the presence or absence of the error of each bit is respectively represented by "1" or "0" and Wne represents an error pattern of the PCM word. Thus syndrome signals $S_1$ and $S_2$ are formed. If no error exists, $S_1=0$ and $S_2=0$. If the parity word P is only erroneous, $S_1 \neq 0$ and $S_2=0$. If the parity word Q is only erroneous, $S_1=0$ and $S_2 \neq 0$. Further, if two words of the parity words P and Q are only erroneous or if one word or more of the PCM date words $W_1$ to $W_6$ are in error, $S_1 \neq 0$ and $S_2 \neq 0$. However, since the error correction is not necessarily required for a case where either of the parity word P or Q is only erroneous, a description will hereinafter be given for a case where the PCM word is erroneous.

1. For a one word error of the PCM word: Can be expressed as:

$$Wi = Wi + Wie$$

where $\widehat{Wi}$ represents an erroneous word, Wi represents a true value, Wie represents an error pattern.

a. If P is correct and the error position i is specified by the error indicator EP, since $$S_1 = \sum_{n=1}^{6} Wne = Wie \text{ thus } Wi = \widehat{Wi} \oplus S_1$$

b. If P is erroneous but Q is correct and the error position i is specified by the error indicator EP, since $$S_2 = \sum_{n=1}^{6} T^{7-n} Wne = T^{7-i} Wie$$

thus $$Wi = \widehat{Wi} \oplus Wie = \widehat{Wi} \oplus T^{i-7} S_2$$

c. If P and Q are correct but the erroneous word of a one word error is unknown, the data word is one word error and if it be represented by $\widehat{Wi}$ thus $S_1 = Wie$ $S_2 = T^{7-i} Wie$ then i to satisfy $$\therefore S_1 = T^{i-7} S_2 \text{ or } T^{7-i} S_1 = S_2$$

is searched. If the i is known,
thus $Wi = \widehat{Wi} \oplus S_1$

2. If P and Q are correct but two words (Wi, Wj) of the PCM word are erroneous (where each error pattern is given as Wie and Wje), can be expressed as follows.

$$\widehat{Wi} = Wi \oplus Wie, \; Wj = Wj \oplus Wje$$

$$\begin{cases} S_1 = Wie \oplus Wje \\ S_2 = T^{7-i} Wie \oplus T^{7-j} Whe \end{cases}$$

$$\therefore Wje = (I \oplus T^{i-j,-1}(S_1 \oplus T^{i-7} S_2)$$

(where letter *I* denotes an unit matrix)

$$Wie = S_1 \oplus Whe$$

$$\widehat{Wi} = Wi \oplus Wie$$

$$= \widehat{Wi} \oplus S_1 \oplus (I \oplus T^{i-j})^{-1} (S_1 \oplus T^{i-7} S_2)$$

$$Wj = \widehat{Wj} \oplus Wje$$

$$= \widehat{Wj} \oplus (I \oplus T^{i-j})^{-1} (S_1 \oplus T^{i-7} S_2)$$

The correcting circuit 19 performs the error corrections described above. In other cases other than the above one, the words regarded as erroneous by the error indicator EP are concealed by the compensating circuit 20 under control of the controller 22. However, if the error position cannot be detected even when the presence of the error is known as described below, all words $W_1$ to $W_6$ are concealed.

3. a. For a case wherein both P and Q are correct, but the erroneous word is unknown and also the error position i cannot be detected by the method of 1-C, for example, erroneous words of two words or above though not specified by the error indicator EP.

3. b. P is correct, but Q is erroneous. Although the error pointer of EP of each word of $W_1$ to $W_6$ does not specify the erroneous word, $S_1 \neq 0$ is established.

3. c. Q is correct, but P is erroneous. Although the error pointer EP of each word of $W_1$ to $W_6$ does not specify the erroneous word, $S_2 \neq 0$ is established.

In this invention, the operation is as follows: If anyone of the cases 3-a to c successively occurs (what is termed a de-interleaving mistake), such successive occurrence is detected by a de-interleaving mistake detector 23 associated with the controller 22 so that the error correction and the compensation of all six words are stopped. At the same time, the controller 22 controls the correcting circuit 19 and the compensating circuit 20 so as to pass the erroneous word which was regarded as without error by the error indicator EP through the compensating circuit 20 as it is and further controls a selector 24 to select the PCM data passed through a slewing rate controller 25. The slewing rate controller 25 can determine the slewing rate as a predetermined value and the slewing rate value to be determined is selected to be relatively low. It is also possible for a digital filter to be provided in place of the slewing rate controller 25. The slewing rate controller 25 or the filter may be provided in the stage where the analog signal is produced at an output of a D/A converter.

There is further provided a detector 27 to detect from the error indicator EP if a burst error becomes too long to be corrected and compensated and a terminal 26 receives an overflow detecting signal from the delay circuit 15 (memory) for de-interleaving. Detector 27 produces an output to perform muting.

Figure 4:
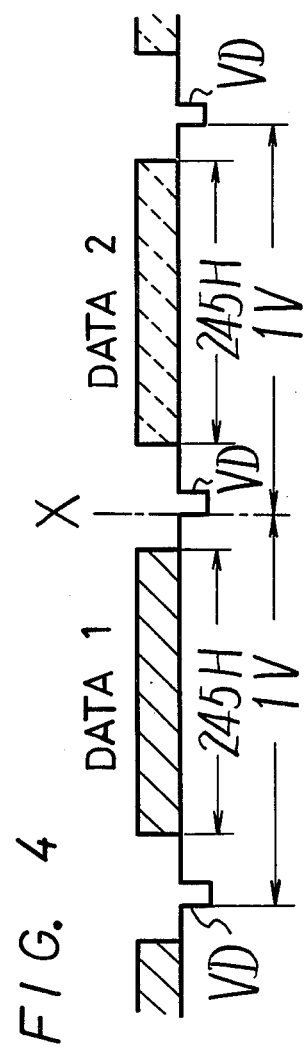
FIG. 4 is a waveform diagram of one example of reproduced data useful for explaining one embodiment of this invention.
Figure 5A:
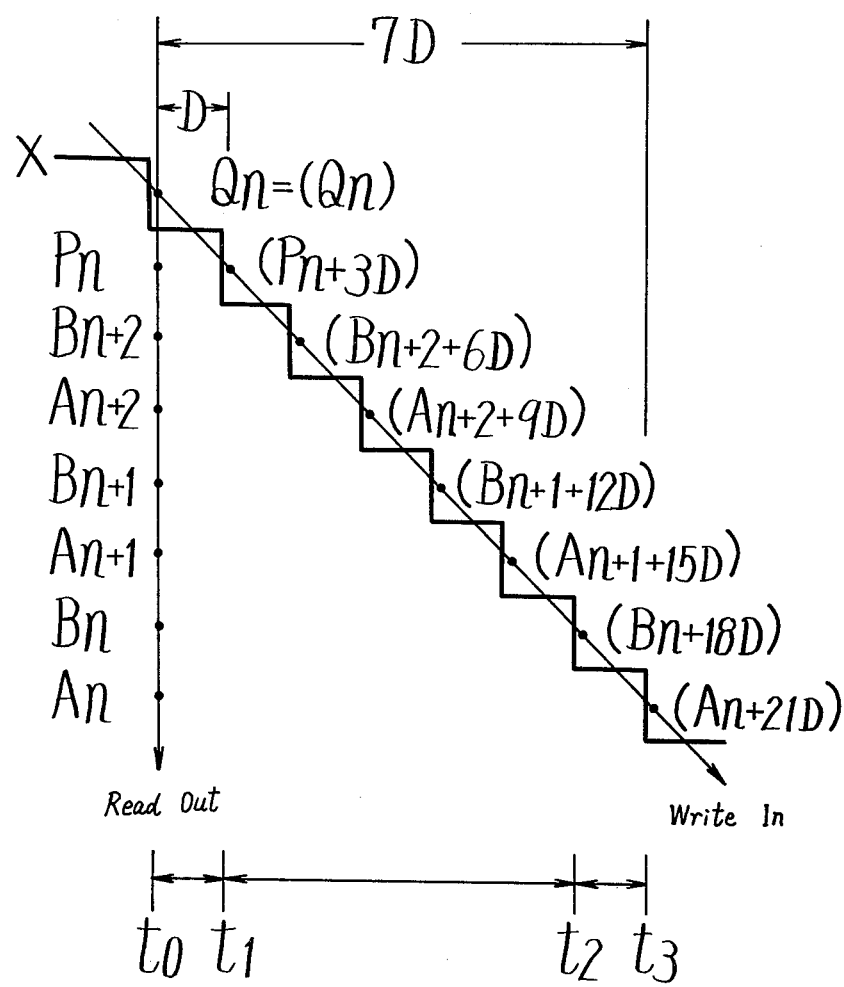
FIGS. 5A and 5B are schematic diagrams for explaining operation of one embodiment of this invention.
Figure 5B:
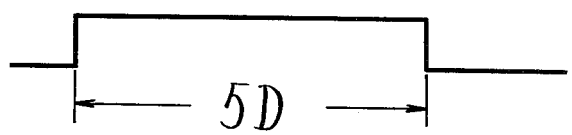

By way of example, as shown in FIG. 4, an editing point X is synchronized with the vertical synchronizing signal VD which is taken as a border and a reproduced signal wherein different data DATA 1 and DATA 2 are interconnected with each other and are supplied to a reproducing decoder. In a memory area in which the memory comprises the de-interleaving circuit 15, the reproduced data comprising one block are written in turn word by word into addresses spaced apart from each other by D and are sequentially read out word by word with respect to the addresses for the same block. As illustrated in FIG. 5A, when data $A_n$, $B_{n-3D}$, . . . $P_{n-18D}$ and $Q_{n-21D}$ of the first block of the DATA 2 after the editing point X is written, data of $A_n$, $B_n$, . . . $P_n$ of the DATA 1 are read out together with $Q_{n-21D}$, i.e., $Q_n$. Accordingly, the de-interleaved output obtained in a period from times $t_0$ to $t_1$ after the D block, only the parity data Q is included in the DATA 2 and other data are all included in the DATA 1. Therefore, with respect to each block obtained during the period $t_0$ to $t_1$, if no error exists, $S_1 = 0$ and $S_2 \neq 0$ and it can be detected that the parity data is erroneous. The data read out obtained in period from $t_1$ to $t_2$ after 5D blocks include different data to two words or more within one block and even if no error exists, $S_1 \neq 0$ and $S_2 \neq 0$ are established which corresponds to a case of 3, as previously described. Thus, the error position i thereof cannot be detected. Further, since the data read out obtained during a period $t_2$ to $t_3$ after D block include different data (DATA 1) of one word within one block and $S_1 \neq 0$ and $S_2 \neq 0$ are established when no error exists. However, since such data is regarded as one word error, a true value can be searched by the error-correction according to the method 1- c previously discussed.

As described above, the detector 23 detects the de-interleaving mistake during the interval of 5D blocks from $t_1$ to $t_2$ wherein the erroneous words of each block in the de-interleaved output have not yet been detected by the error indicator EP and produces a detecting signal as seen in FIG. 5D which goes to a high level in response thereto so as to inhibit the error correction and the compensation of six words and to control the slewing rate controller 25 to produce the output at the selector 24. The output thus produced is, though not shown, converted to an analog output by the D/A converter and divided into respective channels A and B by a demultiplexer. The audio signal corresponding to the data processed in the slewing rate controller 25 is mixed with different audio signals and the ratio of the mixture is adapted to be gradually changed.

As is understood from the description of one embodiment mentioned above, according to this invention, since a discontinuity caused by different audio signals is alleviated by the slewing rate controller 25, sound is not lost by using different audio signals as is the case of muting and since erroneous correction is prevented an abnormal sound will not occur at the output.

Although the invention has been described with respect to preferred embodiments, it is not to be so limited as changes and modifications can be made which are within the full intended scope of the invention as defined by the appended claims.

We claim as our invention:

1. Means for correcting errors in PCM data which has been encoded as interleaved binary data words for two channels and which also includes error-correction and error-detection words, comprising, an error detecting means receiving said PCM data and indicating from said error-detection words whether an error exists in a data format, a means for de-interleaving said PCM data by applying different time delays thereto to produce said binary data words, and said error-correction words and to identify any binary data words in which errors exist, a syndrome signal generating circuit receiving the output of said de-interleaving means to produce error syndrome signals from said binary data words and said error correction words, an error-correcting circuit receiving the outputs of said syndrome signal generating circuit and said means for de-interleaving said PCM data and correcting binary data words in error by using the correct binary data words and the error correction words, a controller, an error signal pattern identifying circuit connected to said controller and receiving an input from said de-interleaving means, an error compensating circuit receiving output of said means for de-interleaving and said controller, and a selector means receiving the outputs of said compensating circuit and said correcting circuit.

2. Means for correcting PCM data according to claim 1 including a first delay means connected to receive the outputs of said correcting circuit and said compensating circuit and supplying an input to said compensating circuit.

3. Means for correcting PCM data according to claim 1 including a slewing rate controller receiving the outputs of said correcting circuit and said compensating circuit and supplying an input to said selector means.

4. Means for correcting PCM data according to claim 1 including a filter means receiving the outputs of said correcting circuit and said compensating circuit and supplying an input to said selector means.

5. Means for correcting errors in PCM data according to claim 4 including a detector connected to said error detecting means and supplying a muting signal under selected error conditions.

6. Means for correcting errors in PCM data according to claim 1 wherein said means for de-interleaving includes a series to parallel converter, and a buffer memory which receives the outputs of said series to parallel converter and said error detecting means.

7. Means for correcting errors in PCM data according to claim 6 wherein said means for de-interleaving includes a plurality of delay means of different delays connected to the output of said buffer memory.

8. Means for correcting errors in PCM data according to claim 7 wherein said plurality of delay means comprise memory means.

9. Means for correcting errors in PCM data according to claim 7 including a one block delay means receiving the outputs of said plurality of delay means and supplying inputs to said compensating circuit and said correcting circuit.

* * * * *